United States Patent
Li et al.

(10) Patent No.: US 11,474,786 B2
(45) Date of Patent: Oct. 18, 2022

(54) FAST DIGITAL MULTIPLY-ACCUMULATE (MAC) BY FAST DIGITAL MULTIPLICATION CIRCUIT

(71) Applicant: QUALCOMM Incorporated, San Diego, CA (US)

(72) Inventors: Xia Li, San Diego, CA (US); Zhongze Wang, San Diego, CA (US); Periannan Chidambaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/778,749

(22) Filed: Jan. 31, 2020

(65) Prior Publication Data

US 2021/0240447 A1 Aug. 5, 2021

(51) Int. Cl.
*G06F 7/533* (2006.01)
*G06F 7/53* (2006.01)
*G06F 7/523* (2006.01)

(52) U.S. Cl.
CPC ............ *G06F 7/5334* (2013.01); *G06F 7/523* (2013.01); *G06F 7/5324* (2013.01)

(58) Field of Classification Search
CPC ........ G06F 7/487; G06F 7/4876; G06F 7/462; G06F 7/467; G06F 7/52; G06F 7/523; G06F 7/53; G06F 7/533; G06F 7/5324; G06F 7/5334

See application file for complete search history.

(56) References Cited

U.S. PATENT DOCUMENTS

2012/0226731 A1* 9/2012 Gashkov ................. G06F 7/724
  708/620
2019/0310828 A1* 10/2019 Langhammer ........ G06F 7/5324

OTHER PUBLICATIONS

S. Arish et al., An efficient floating point multiplier design for high speed applications using Karatsuba algorithm and Urdhva-Tiryagbhyam algorithm, 2015 International Conference on Signal Processing and Communication (ICSC), IEEE, 2015 (Year: 2015).*
C.Y. Lee et al., Digit-Serial Versatile Multiplier Based on a Novel Block Recombination of the Modified Overlap-Free Karatsuba Algorithm, IEEE Transactions on Circuits and Systems—I: Regular Papers, Vo. 66, No. 1, 2019 (Year: 2019).*
J. von zur Gathen et al., Efficient FPGA-Based Karatsuba Multipliers for Polynomials over F2, 12th International Workshop, LNCS 3897, Selected Areas in Cryptography, SAC 2005, pp. 359-369, 2005 (Year: 2005).*

(Continued)

*Primary Examiner* — Emily E Larocque
(74) *Attorney, Agent, or Firm* — Patterson+ Sheridan, L.L.P.

(57) ABSTRACT

Certain aspects provide methods and apparatus for multiplication of digital signals. In accordance with certain aspects, a multiplication circuit may be used to multiply a portion of a first digital input signal with a portion of a second digital input signal via a first multiplier circuit to generate a first multiplication signal, and multiply another portion of the first digital input signal with another portion of the second digital input signal via a second multiplier circuit to generate a second multiplication signal. A third multiplier circuit and multiple adder circuits may be used to generate an output of the multiplication circuit based on the first and second multiplication signals.

20 Claims, 4 Drawing Sheets

(56) References Cited

OTHER PUBLICATIONS

D. Patterson and J. Hennessy, Computer Organization and Design, the Hardware/Software Interface, 3rd edition, Elsevier, 2007, ch 1 p. 15-16, (Year: 2007).*

Ercegovac et al., Digital Arithmetic, Elsevier Science & Technology, 2003, ch 2 section 2.2 (Year: 2003).*

* cited by examiner

FAST DIGITAL MULTIPLY-ACCUMULATE (MAC) BY FAST DIGITAL MULTIPLICATION CIRCUIT

FIELD OF THE DISCLOSURE

The present disclosure generally relates to electronic circuits and, more particularly, to circuitry for digital signal multiplication.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks (CNNs) are a type of feed-forward artificial neural network. Convolutional neural networks may include collections of artificial neurons that each have a receptive field and that collectively tile an input space. Convolutional neural networks have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

SUMMARY

Certain aspects of the present disclosure are directed to methods and apparatus for multiplication of digital signals.

Certain aspects of the present disclosure provide a circuit for digital signal processing. The circuit generally includes: a first multiplier circuit configured to multiply a first portion of a first digital input signal with a first portion of a second digital input signal (e.g., digital weight signal) to generate a first multiplication signal; a second multiplier circuit configured to multiply a second portion of the first digital input signal with a second portion of the second digital input signal to generate a second multiplication signal; a first adder circuit configured to add the first portion and the second portion of the first digital input signal to generate a first addition signal; a second adder circuit configured to add the first portion and the second portion of the second digital input signal to generate a second addition signal; a third multiplier circuit configured to multiply the first addition signal and the second addition signal to generate a third multiplication signal; a third adder circuit configured to add the first multiplication signal and the second multiplication signal to generate a third addition signal; a subtraction circuit configured to subtract the third addition signal from the third multiplication signal to generate a subtraction signal; and one or more adder circuits configured to add a left-shifted version of the first multiplication signal, the second multiplication signal, and a left-shifted version of the subtraction signal.

Certain aspects of the present disclosure provide a method for digital signal processing. The method generally includes: multiplying, via a first multiplier circuit, a first portion of a first digital input signal with a first portion of a second digital input signal (e.g., a digital weight signal) to generate a first multiplication signal; multiplying, via a second multiplier circuit, a second portion of the first digital input signal with a second portion of the second digital input signal to generate a second multiplication signal; adding, via a first adder circuit, the first portion and the second portion of the first digital input signal to generate a first addition signal; adding, via a second adder circuit, the first portion and the second portion of the second digital input signal to generate a second addition signal; multiplying, via a third multiplier circuit, the first addition signal and the second addition signal to generate a third multiplication signal; adding, via a third adder circuit, the first multiplication signal and the second multiplication signal to generate a third addition signal; subtracting, via a subtraction circuit, the third addition signal from the third multiplication signal to generate a subtraction signal; and adding, via one or more adder circuits, a left-shifted version of the first multiplication signal, the second multiplication signal, and a left-shifted version of the subtraction signal.

Certain aspects of the present disclosure provide an apparatus for digital signal processing. The apparatus generally includes: means for multiplying a first portion of a first digital input signal with a first portion of a second digital input signal (e.g., a digital weight signal) to generate a first multiplication signal; means for multiplying a second portion of the first digital input signal with a second portion of the second digital input signal to generate a second multiplication signal; means for adding the first portion and the second portion of the first digital input signal to generate a first addition signal; means for adding the first portion and the second portion of the second digital input signal to generate a second addition signal; means for multiplying the first addition signal and the second addition signal to generate a third multiplication signal; means for adding the first multiplication signal and the second multiplication signal to generate a third addition signal; means for subtracting the third addition signal from the third multiplication signal to generate a subtraction signal; and means for adding a left-shifted version of the first multiplication signal, the second multiplication signal, and a left-shifted version of the subtraction signal.

Other aspects, advantages, and features of the present disclosure will become apparent after review of the entire application, including the following sections: Brief Description of the Drawings, Detailed Description, and the Claims.

DETAILED DESCRIPTION

Certain aspects of the present disclosure provide methods and apparatus for multiplication of digital signals for multiply-accumulate (MAC) operations. Such MAC operations may be used, for example, in machine learning and artificial intelligence (AI) implementations (e.g., artificial neural networks).

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Example Artificial Neural Networks

Figure 1:
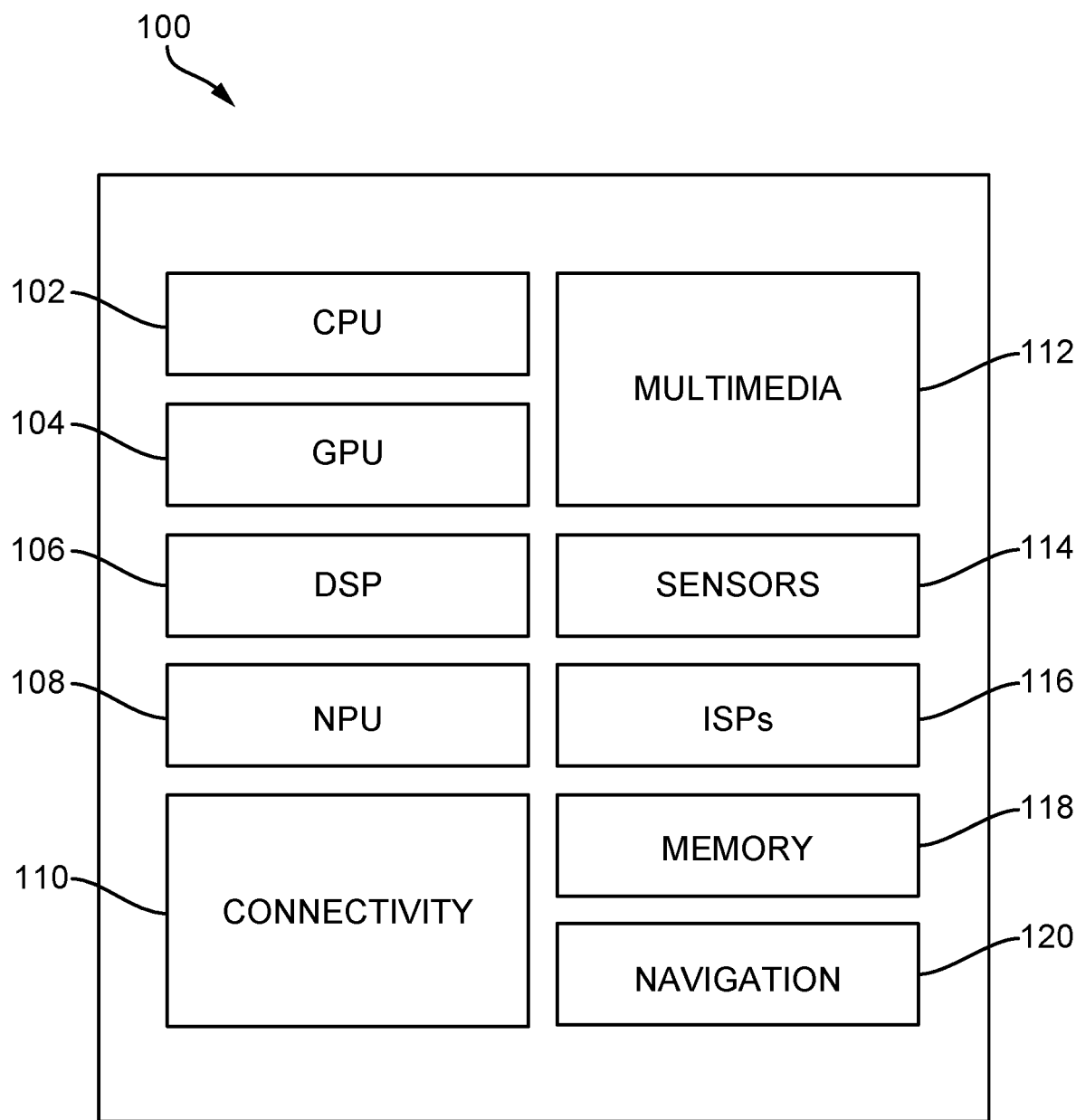
FIG. 1 illustrates an example implementation of a system-on-a-chip (SOC).

FIG. 1 illustrates an example implementation of a system-on-a-chip (SOC) 100, which may include a central processing unit (CPU) 102, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. In certain aspects, weights may be stored in a static random-access memory (SRAM), as described in more detail herein. Instructions executed at the CPU 102 may be loaded from a program memory associated with the CPU 102 or may be loaded from the memory block 118.

The SOC 100 may also include additional processing blocks tailored to specific functions, such as a GPU 104, a DSP 106, a connectivity block 110—which may include fifth generation (5G) connectivity, fourth generation long term evolution (4G LTE) connectivity, Wi-Fi connectivity, USB connectivity, Bluetooth connectivity, and the like—and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or a navigation module 120, which may include a global positioning system (GPS).

The SOC 100 may be based on an advanced reduced instruction set computing (RISC) (ARM) machine instruction set. In an aspect of the present disclosure, the instructions loaded into the CPU 102 may comprise code to search for a stored multiplication result in a lookup table (LUT) corresponding to a multiplication product of an input feature value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input feature and the filter weight when a lookup table miss of the multiplication product is detected.

SOC 100 and/or components thereof may be configured to perform video compression and/or decompression according to aspects of the present disclosure discussed below. By using deep learning architectures to perform video compression and/or decompression, aspects of the present disclosure may accelerate the compression of video content on a device and transmission of the compressed video to another device and/or may accelerate the decompression of compressed video content received at the device.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep neural network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Example Fast Multiplication Circuit

Certain aspects of the present disclosure are generally directed to techniques and apparatus for multiplication of digital signals for multiply-addition-accumulation (MAC) operations that may be used for machine learning and artificial intelligence (AI) implementations, for example. The multiplication circuitry described herein may be faster, and have lower power consumption, and small chip area, as compared to traditional multiplication approaches. The multiplication circuitry described herein is based on the Karatsuba algorithm. The Karatsuba algorithm is a fast multiplication algorithm that reduces the multiplication of two n-digit numbers to at most $n^{1.58}$ multiplications, which is less than typical multiplication circuitry which may use $2^n$ single-digit multiplications.

Figure 2:
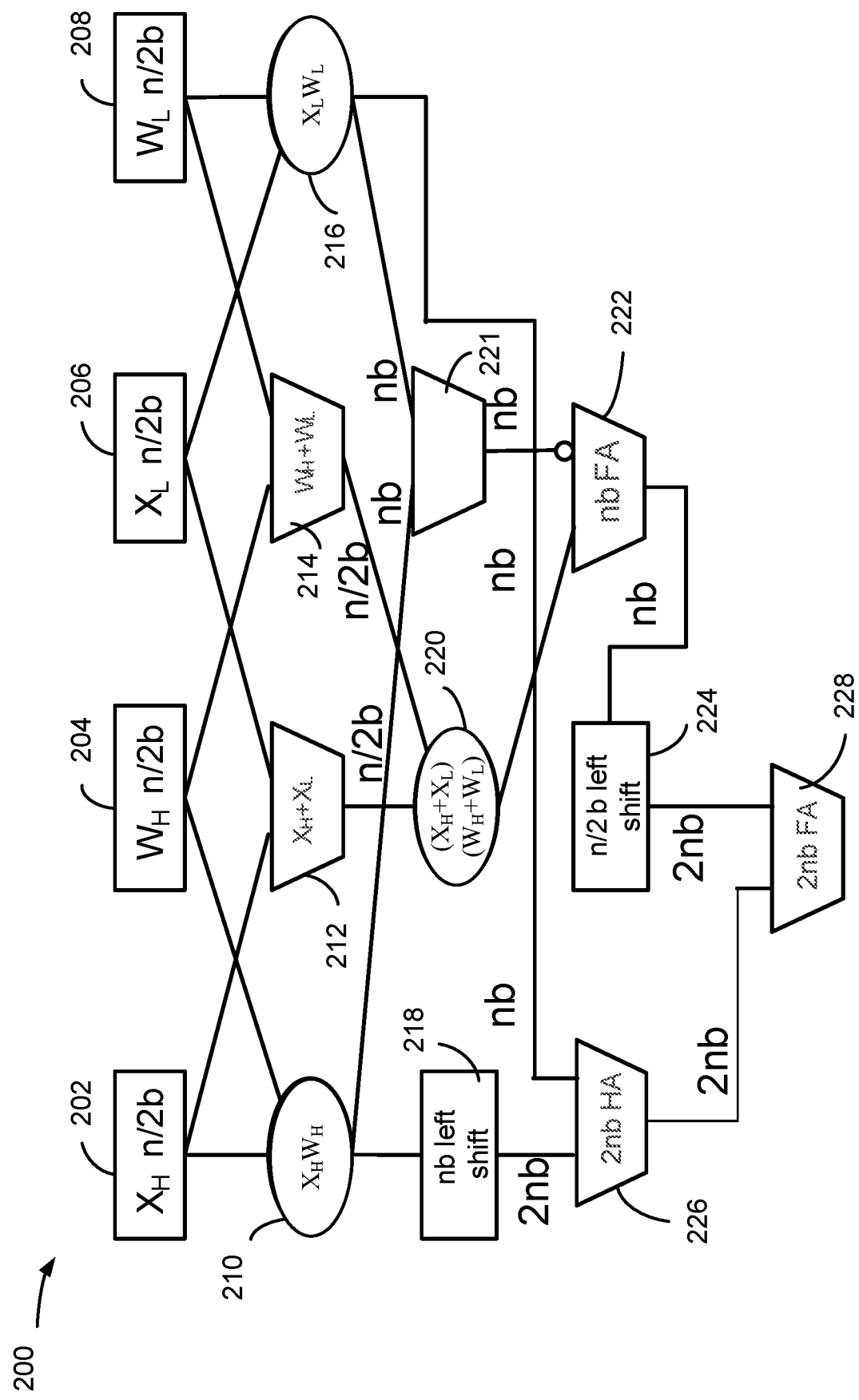
FIG. 2 is a block diagram illustrating a multiplication circuit for multiplying digital inputs, in accordance with certain aspects of the present disclosure.

FIG. 2 is a block diagram illustrating a multiplication circuit 200 for multiplying a digital activation input X and digital weight input W, in accordance with certain aspects of the present disclosure. The digital weight input W may be a Kernel/weight (e.g., synaptic weight) of a neural network. Each of the digital inputs X and W may have n bits, n being an integer greater than 1. The digital activation input X includes n/2 most significant bits (referred to herein as $X_H$) and n/2 least significant bits (referred to herein as $X_L$), and the digital weight input W includes n/2 most significant bits (referred to herein as $W_H$) and n/2 least significant bits (referred to herein as $W_L$). The multiplication circuit 200 may be implemented to multiply X and W in accordance with the following multiplication process:

$$\begin{array}{r} X_H X_L \\ \times \quad W_H W_L \\ \hline X_L W_L \\ SS \\ + \quad X_H W_H \\ \hline X_H W_H * 2^n + SS * 2^{n/2} + X_L W_L \end{array}$$

As illustrated, the multiplication process includes the product of $X_L$ and $W_L$ and the product $X_H$ and $W_H$. Thus, as illustrated in FIG. 2, $X_H$ 202 and $W_H$ 204 may be provided to an n/2 bit (n/2b) multiplier circuit 210, and $X_L$ 206 and $W_L$ 208 may be provided to an n/2 bit multiplier circuit 216. An intermediary calculation may be performed to generate the digital signal SS, SS representing:

$$(X_H+X_L)*(W_H+W_L)-(X_HW_H+X_LW_L)$$

As illustrated in FIG. 2, $X_H$ and $X_L$ may be added using an adder circuit 212 (e.g., an n/2 bit full adder (FA)), and $W_H$ and $W_L$ may be added using an adder circuit 214 (e.g., an n/2 bit FA). The sum of $X_H$ and $X_L$ and the sum of $W_H$ and $W_L$ may be multiplied via an n/2 bit multiplier circuit 220 in order to generate a digital signal representing $(X_H+X_L)*(W_H+W_L)$. Moreover, the product of $X_H$ and $W_H$ and the product of $X_L$ and $W_L$ may be added using adder circuit 221 (e.g., n bit FA) to generate a digital signal representing $X_HW_H+X_LW_L$.

As illustrated, the digital signal representing $(X_H+X_L)*(W_H+W_L)$ at the output of the multiplier circuit 220 is provided to a non-inverting input of an adder circuit 222, and the digital signal representing $X_HW_H+X_LW_L$ at the output of the adder circuit 221 is provided to an inverting input of the adder circuit 222. Therefore, the adder circuit 222 in effect subtracts the digital signal representing $X_HW_H+X_LW_L$ from the digital signal representing $(X_H+X_L)*(W_H+W_L)$ to generate the digital signal SS described herein.

As illustrated, the output of the multiplier circuit 210 (product of $X_H$ and $W_H$) is left-shifted by n bits at block 218. The block 218 may represent left-shift circuitry, or wiring (e.g., interface), that left-shifts the output of the multiplier circuit 210 by n bits. The left-shifted digital signal representing the product of $X_H$ and $W_H$ is then added to the product of $X_L$ and $W_L$ at the output of the multiplier circuit 216 via a 2n bit adder circuit 226 (e.g., half adder (HA)). Moreover, the digital signal representing SS at the output of the adder circuit 222 is left-shifted by n/2 bits at block 224. The left-shifted digital signal representing SS and the output of the adder circuit 226 are added via a 2n bit adder circuit 228 (e.g., FA) to generate the output of the multiplication circuit 200. The multiplication circuitry described herein is implemented using three n/2 bit multipliers, as compared to traditional multiplication approaches that may use four n/2 bit multipliers. Moreover, the multiplication circuitry described herein performs multiplication operations faster, with less power, and using a smaller circuit area, than traditional multiplication approaches.

Figure 3:
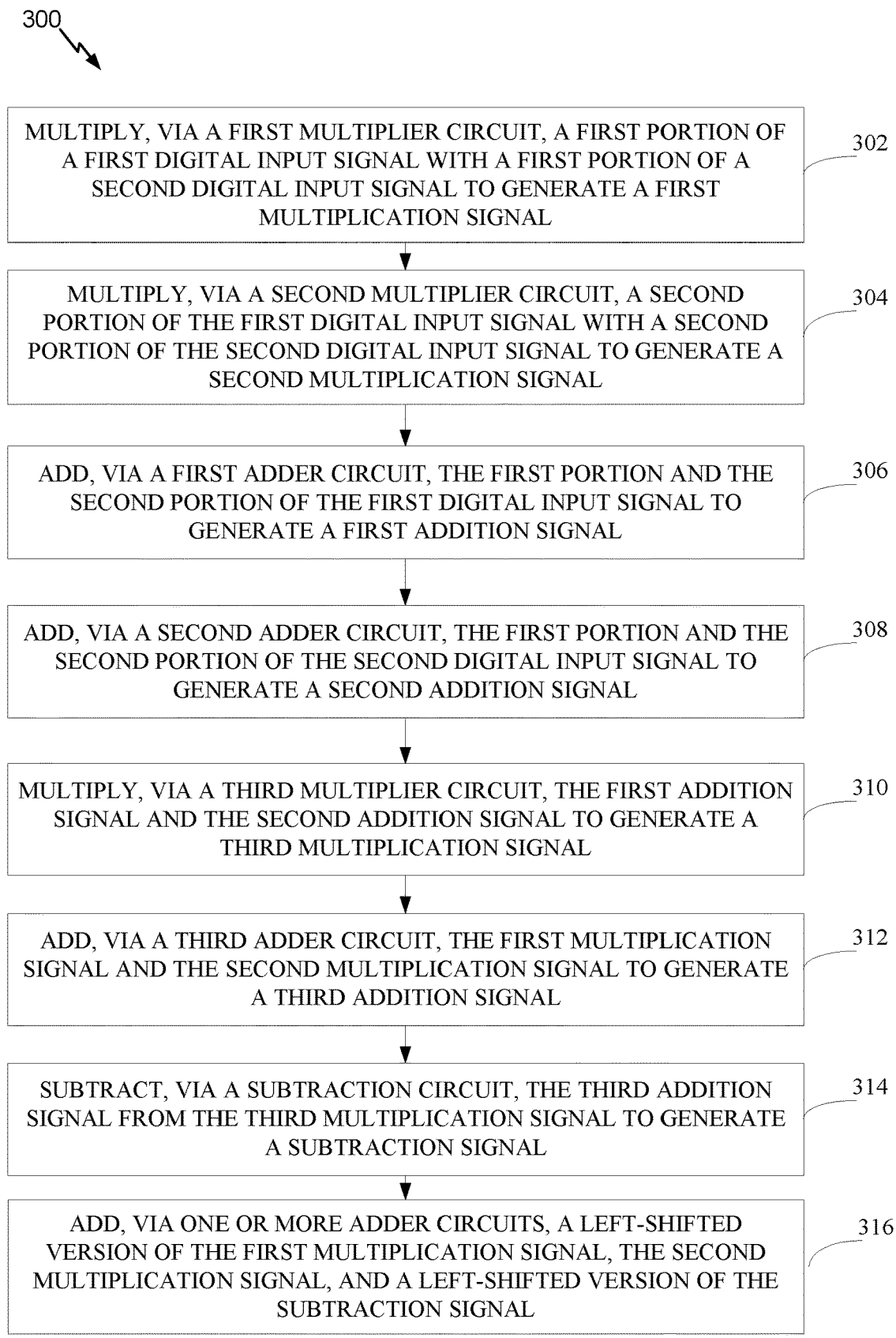
FIG. 3 is a flow diagram illustrating example operations for digital signal processing, in accordance with certain aspects of the present disclosure.

FIG. 3 is a flow diagram illustrating example operations 300 for digital signal processing, in accordance with certain aspects of the present disclosure. The operations 300 may be performed by a multiplication circuit, such as the multiplication circuit 200.

The operations 300 begin, at block 302, with the multiplication circuit multiplying (e.g., via a multiplier circuit 210) a first portion (e.g., $X_H$) of a first digital activation input signal (e.g., X) with a first portion (e.g., W0 of a second digital input signal (e.g., digital weight input signal (W)) to generate a first multiplication signal (e.g., $X_HW_H$), and at block 304, multiplying (e.g., via a multiplier circuit 216) a second portion (e.g., $X_L$) of the first digital activation input signal with a second portion (e.g., $W_L$) of the second digital input signal to generate a second multiplication signal (e.g., $X_LW_L$). The first portion of the first (or second) digital input signal may include the MSBs, whereas the second portion of the first (or second) digital input signal may include the LSBs (i.e., the first portion may precede the second portion). At block 306, the multiplication circuit may add (e.g., via adder circuit 212) the first portion and the second portion of the first digital activation input signal to generate a first addition signal (e.g., $X_H+X_L$), and at block 308, add (e.g., via the adder circuit 214) the first portion and the second portion of the second digital input signal to generate a second addition signal (e.g., $W_H+W_L$). At block 310, the multiplication circuit may multiply (e.g., via multiplier circuit 220) the first addition signal and the second addition signal to generate a third multiplication signal (e.g., $(X_H+X_L)*(W_H+W_L)$). At block 312, the multiplication circuit may add (e.g., via the adder circuit 221) the first multiplication signal and the second multiplication signal to generate a third addition signal (e.g., $X_HW_H+X_LW_L$). At block 314, the multiplication circuit may subtract (e.g., via a subtraction circuit, such as the adder circuit 222 having an inverting input), the third addition signal from the third multiplication signal to generate a subtraction signal (e.g., SS).

At block 316, the multiplication circuit may add a left-shifted version of the first multiplication signal, the second multiplication signal, and a left-shifted version of the subtraction signal. For example, adding the left-shifted version of the first multiplication signal, the second multiplication signal, and the left-shifted version of the subtraction signal may include adding (e.g., via adder circuit 226) the left-shifted version of the first multiplication signal and the second multiplication signal to generate a fourth addition signal, and adding (e.g., via adder circuit 228) the fourth addition signal and the left-shifted version of the subtraction signal.

In certain aspects, the operations 300 may also include left-shifting the bits of the first multiplication signal to generate the left-shifted version of the first multiplication signal. For example, the bits of the first multiplication signal may be left-shifted by n bits, n representing a quantity of bits of the first digital input signal. The operations may also include left-shifting the bits of the subtraction circuit to generate the left-shifted version of the subtraction circuit. The bits of the subtraction signal may be left-shifted by n/2 bits.

Figure 4:
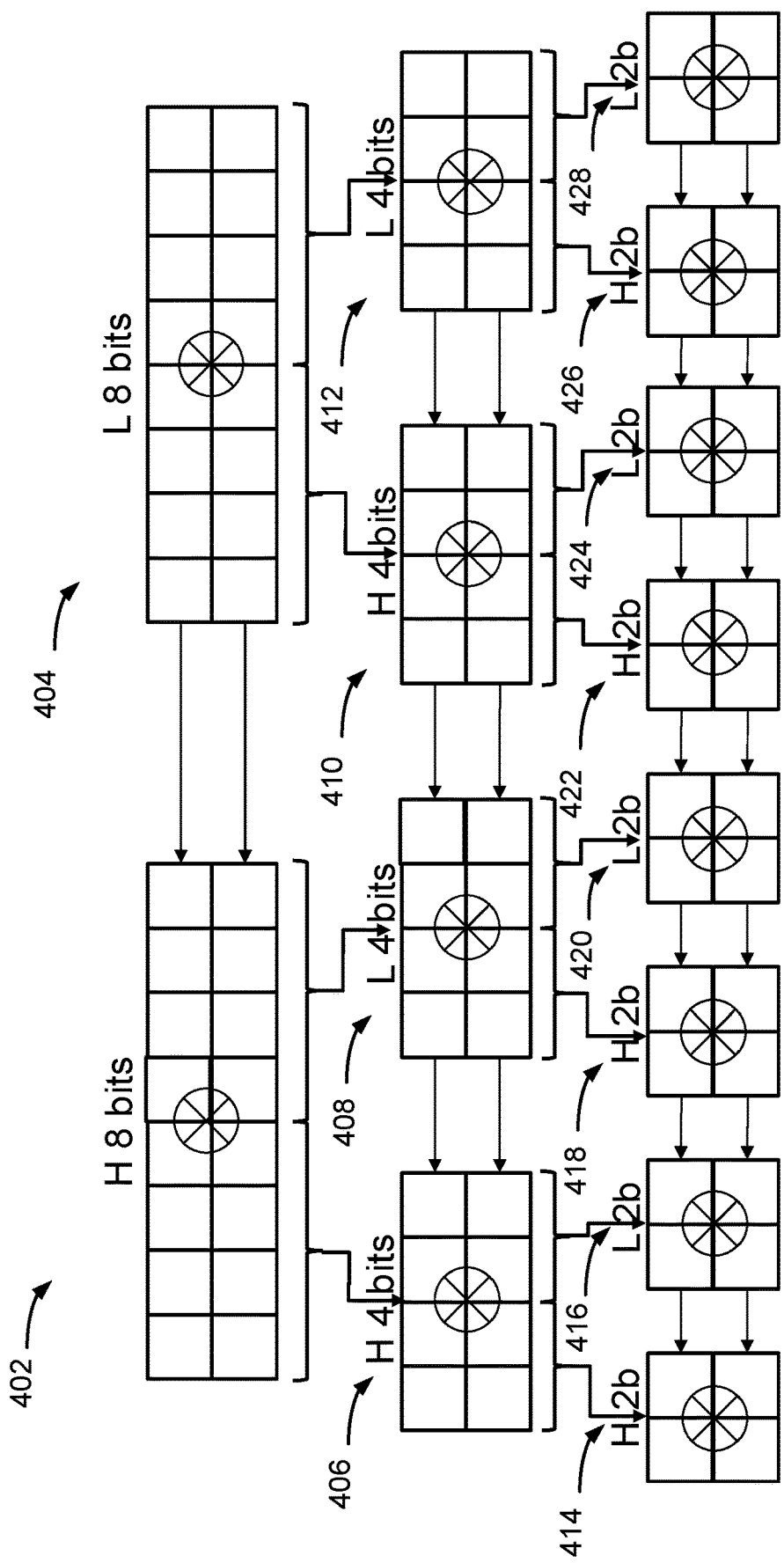
FIG. 4 illustrates example operations for a recursive fast multi-bit multiplier, in accordance with certain aspects of the present disclosure.

FIG. 4 illustrates example operations for a recursive fast multi-bit multiplier, in accordance with certain aspects of the present disclosure. As illustrated, the multi-bit multiplier may be implemented by splitting each of 16-bit digital input signals (e.g., corresponding an activation input signal X and a digital weight signal W) to be multiplied into two 8-bit digital signals 402, 404, allowing the multiplication to be performed using three 8-bit multipliers (e.g., as described with respect to FIGS. 2 and 3). In certain aspects, the 8-bit digital signals 402 may be further split into two 4-bit digital signals 406, 408 and the 8-bit digital signals 404 may be further split into two 4-bit digital signals 410, 412. In this case, the fast multiplication may be performed using nine 4-bit multipliers. In certain aspects, the 4-bit digital signals 406 may be split into two 2-bit digital signals 414, 416, the 4-bit digital signals 408 may be split into two 2-bit digital signals 418, 420, the 4-bit digital signals 410 may be split into two 2-bit digital signals 422, 424, and the 4-bit digital signals 412 may be split into two 2-bit digital signals 426, 428. In this case, the fast multiplier may be implemented using twenty-seven 2-bit multipliers.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, means for multiplying may comprise a multiplier circuit, such as the multiplier circuit 210, 216, or 220. Means for adding may comprise an adder circuit, such as the adder circuit 212, 214, 221, 226, or 228. Means for subtracting may comprise an adder circuit, such as the adder circuit 222 having an inverting input.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A multiply-and-accumulate (MAC) circuit for an artificial neural network, comprising:
   a first multiplier circuit configured to multiply a first portion of a first digital input signal with a first portion of a second digital input signal to generate a first multiplication signal, wherein the first digital input signal is a digital activation input signal of the artificial neural network and wherein the second digital input signal is a digital weight input signal of the artificial neural network;
   a second multiplier circuit configured to multiply a second portion of the first digital input signal with a second portion of the second digital input signal to generate a second multiplication signal;
   a first adder circuit configured to add the first portion and the second portion of the first digital input signal to generate a first addition signal;
   a second adder circuit configured to add the first portion and the second portion of the second digital input signal to generate a second addition signal;
   a third multiplier circuit configured to multiply the first addition signal and the second addition signal to generate a third multiplication signal, the third multiplier circuit having a first input coupled to an output of the first adder circuit and having a second input coupled to an output of the second adder circuit;
   a third adder circuit configured to add the first multiplication signal and the second multiplication signal to generate a third addition signal, the third adder circuit having a first input coupled to an output of the first multiplier circuit and having a second input coupled to an output of the second multiplier circuit;
   a subtraction circuit configured to subtract the third addition signal from the third multiplication signal to generate a subtraction signal, the subtraction circuit having a first input coupled to an output of the third multiplier circuit and having a second input coupled to an output of the third adder circuit; and
   one or more adder circuits configured to add a left-shifted version of the first multiplication signal, the second multiplication signal, and a left-shifted version of the subtraction signal, the one or more adder circuits having a first input coupled to the output of the output of the first multiplier circuit, a second input coupled to the output of the second multiplier circuit, and a third input coupled to an output of the subtraction circuit.

2. The circuit of claim 1, wherein:
the first portion of the first digital input signal comprises one or more most significant bits (MSBs) of the first digital input signal;
the first portion of the second digital input signal comprises one or more MSBs of the second digital input signal;
the second portion of the first digital input signal comprises one or more least significant bits (LSBs) of the first digital input signal; and
the second portion of the second digital input signal comprises one or more LSBs of the second digital input signal.

3. The circuit of claim 2, wherein a quantity of bits of each of the first digital input signal and the second digital input signal is n, wherein the one or more MSBs of the first digital input signal comprises n/2 bits, wherein the one or more MSBs of the second digital input signal comprises n/2 bits, wherein the one or more LSBs of the first digital input signal comprises n/2 bits, and wherein the one or more LSBs of the second digital input signal comprises n/2 bits.

4. The circuit of claim 1, further comprising an interface configured to left-shift bits of the first multiplication signal to generate the left-shifted version of the first multiplication signal.

5. The circuit of claim 4, wherein the interface comprises a left-shift circuit.

6. The circuit of claim 4, wherein the interface is configured to left-shift the bits of the first multiplication signal by n bits, n representing a quantity of bits of the first digital input signal.

7. The circuit of claim 1, further comprising an interface configured to left-shift bits of the subtraction signal to generate the left-shifted version of the subtraction circuit.

8. The circuit of claim 7, wherein the interface comprises a left-shift circuit.

9. The circuit of claim 7, wherein the interface is configured to left-shift the bits of the subtraction signal by n/2 bits, n representing a quantity of bits of the first digital input signal.

10. The circuit of claim 1, wherein the one or more adder circuits comprise:
a fourth adder circuit configured to add the second multiplication signal and the left-shifted version of the first multiplication signal to generate a fourth addition signal; and
a fifth adder circuit configured to add the fourth addition signal and the left-shifted version of the subtraction signal.

11. The circuit of claim 10, wherein the fourth adder circuit is a half adder (HA), and wherein the fifth adder circuit is a full adder (FA).

12. The circuit of claim 1, wherein the first adder circuit, the second adder circuit, the third adder circuit, and the subtraction circuit are full adders (FAs).

13. The circuit of claim 1, wherein the subtraction circuit comprises an adder having an inverting input and a non-inverting input, wherein the third addition signal is provided to the inverting input, and wherein the third multiplier signal is provided to the non-inverting input.

14. A system on a chip (SoC) comprising the MAC circuit of claim 1, the SoC further comprising:

at least one processor; and
a memory coupled to the processor and to the MAC circuit, the memory being configured to store a result output by the MAC circuit.

15. A method of performing multiply-and-accumulate (MAC) operations for an artificial neural network, comprising:
multiplying, via a first multiplier circuit, a first portion of a first digital input signal with a first portion of a second digital input signal to generate a first multiplication signal, wherein the first digital input signal is a digital activation input signal of the artificial neural network and wherein the second digital input signal is a digital weight input signal of the artificial neural network;
multiplying, via a second multiplier circuit, a second portion of the first digital input signal with a second portion of the second digital input signal to generate a second multiplication signal;
adding, via a first adder circuit, the first portion and the second portion of the first digital input signal to generate a first addition signal;
adding, via a second adder circuit, the first portion and the second portion of the second digital input signal to generate a second addition signal;
multiplying, via a third multiplier circuit, the first addition signal and the second addition signal to generate a third multiplication signal, the third multiplier circuit having a first input coupled to an output of the first adder circuit and having a second input coupled to an output of the second adder circuit;
adding, via a third adder circuit, the first multiplication signal and the second multiplication signal to generate a third addition signal, the third adder circuit having a first input coupled to an output of the first multiplier circuit and having a second input coupled to an output of the second multiplier circuit;
subtracting, via a subtraction circuit, the third addition signal from the third multiplication signal to generate a subtraction signal, the subtraction circuit having a first input coupled to an output of the third multiplier circuit and having a second input coupled to an output of the third adder circuit; and
adding, via one or more adder circuits, a left-shifted version of the first multiplication signal, the second multiplication signal, and a left-shifted version of the subtraction signal, the one or more adder circuits having a first input coupled to the output of the output of the first multiplier circuit, a second input coupled to the output of the second multiplier circuit, and a third input coupled to an output of the subtraction circuit.

16. The method of claim 15, wherein:
the first portion of the first digital input signal comprises one or more most significant bits (MSBs) of the first digital input signal;
the first portion of the second digital input signal comprises one or more MSBs of the second digital input signal;
the second portion of the first digital input signal comprises one or more least significant bits (LSBs) of the first digital input signal; and
the second portion of the second digital input signal comprises one or more LSBs of the second digital input signal.

17. The method of claim 16, wherein a quantity of bits of each of the first digital input signal and the second digital input signal is n, wherein the one or more MSBs of the first digital input signal comprises n/2 bits, wherein the one or more MSBs of the second digital input signal comprises n/2 bits, wherein the one or more LSBs of the first digital input signal comprises n/2 bits, and wherein the one or more LSBs of the second digital input signal comprises n/2 bits.

18. The method of claim 15, further comprising left-shifting bits of the first multiplication signal to generate the left-shifted version of the first multiplication signal, wherein the bits of the first multiplication signal are left-shifted by n bits, n representing a quantity of bits of the first digital input signal.

19. The method of claim 15, further comprising left-shifting bits of the subtraction signal to generate the left-shifted version of the subtraction circuit, wherein the bits of the subtraction signal are left-shifted by n/2 bits, n representing a quantity of bits of the first digital input signal.

20. The method of claim 15, wherein adding the left-shifted version of the first multiplication signal, the second multiplication signal, and the left-shifted version of the subtraction signal comprises:
    adding, via a fourth adder circuit, the left-shifted version of the first multiplication signal and the second multiplication signal to generate a fourth addition signal; and
    adding, via a fifth adder circuit, the fourth addition signal and the left-shifted version of the subtraction signal.

* * * * *